April 21, 1942.  V. G. BIRO  2,280,621
MEAT CUTTING MACHINE
Filed Nov. 25, 1940  3 Sheets-Sheet 1

Inventor
Vincent G. Biro
By Faust G. Crampton
Attorney

Inventor
Vincent G. Biro

Inventor
Vincent G. Biro
By [signature]
Attorney

Patented Apr. 21, 1942

2,280,621

UNITED STATES PATENT OFFICE 2,280,621

MEAT CUTTING MACHINE

Vincent G. Biro, Marblehead, Ohio

Application November 25, 1940, Serial No. 366,945

3 Claims. (Cl. 146—88)

My invention has for its object to provide a meat cutting machine having an adjustable guide plate for determining the thickness of the slices as they are cut and which may be readily adjusted to produce exact slice thickness and, yet, prevent material deviation from the exact adjustment by pressure on either side of the plate.

The invention consists in a guide plate adjusting means having a rotatable spiral gear that engages a rack at an angle to produce a slight movement of the plate by an extended rotative movement of the gear and, thus, substantially lock the plate in its adjusted position by the friction between contacting gears and the high multiplication of pressure on one side of the plate to produce dislocation of the plate from its adjusted position.

The invention, also, provides a slidable and rotatable guide plate for meat slicing having a lug for limiting its slidable movements and its transverse movement in either direction and its rotative movements in one direction to maintain the parts in a definite coacting relation and prevent accidental injury of parts of the machine.

The invention consists in other features and advantages which will appear from the following description and upon examination of the drawings. Structures containing the invention may partake of different forms and still embody the invention. To illustrate a practical application of the invention, I have selected a meat cutting machine as an example of the various structures and details thereof that contain the invention and shall describe the selected structure hereinafter, it being understood that variations may be made without departing from the spirit of the invention. The particular structure selected is shown in the accompanying drawings and described hereinafter.

Figure 1:
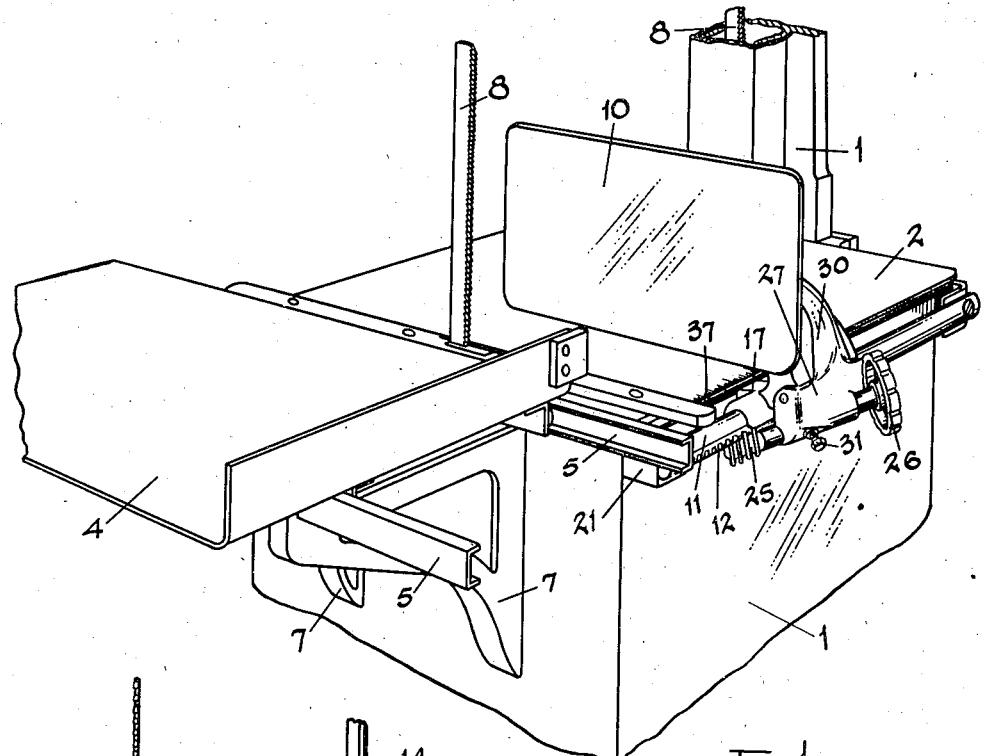
Figure 2:
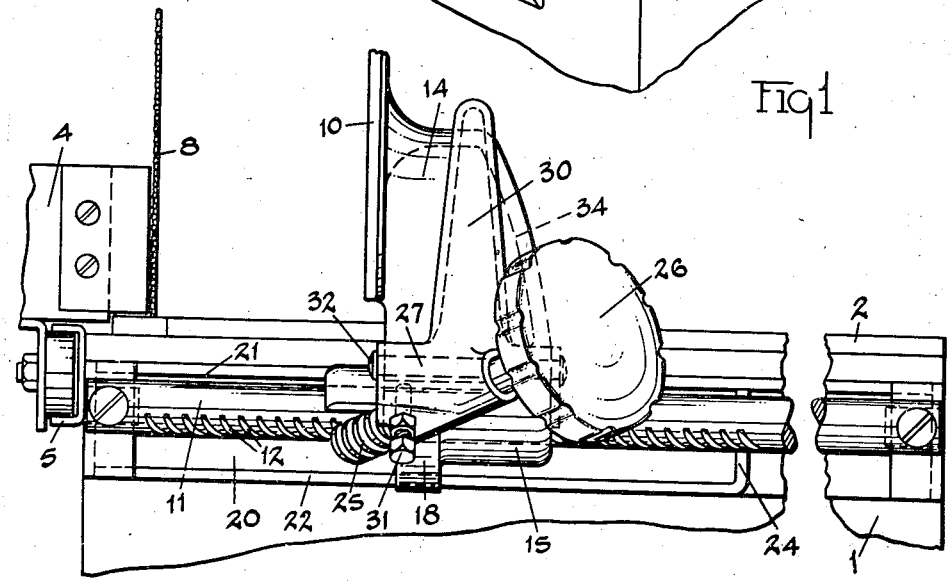
Figure 3:
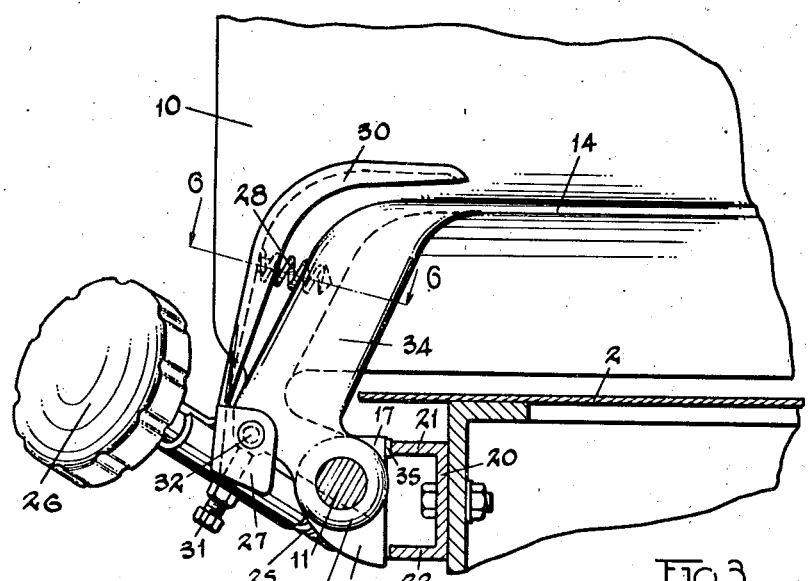
Figure 4:
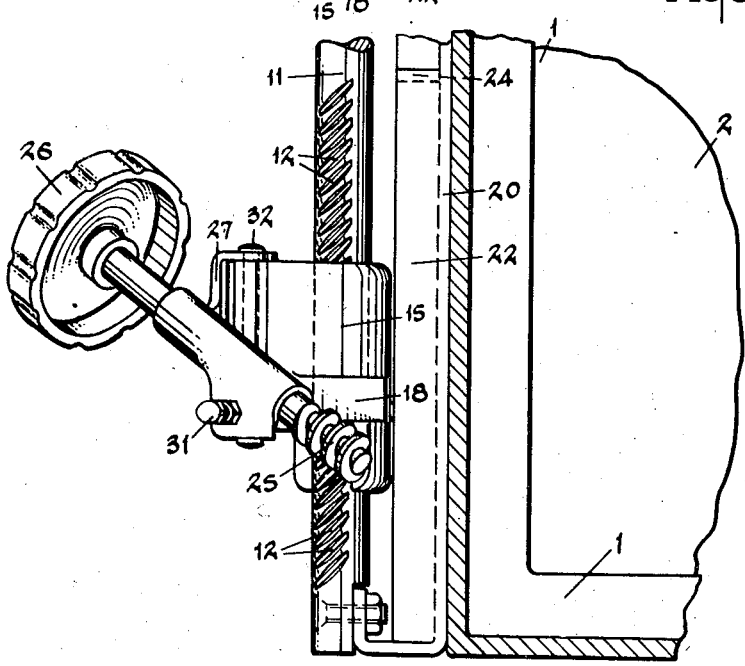
Figure 5:
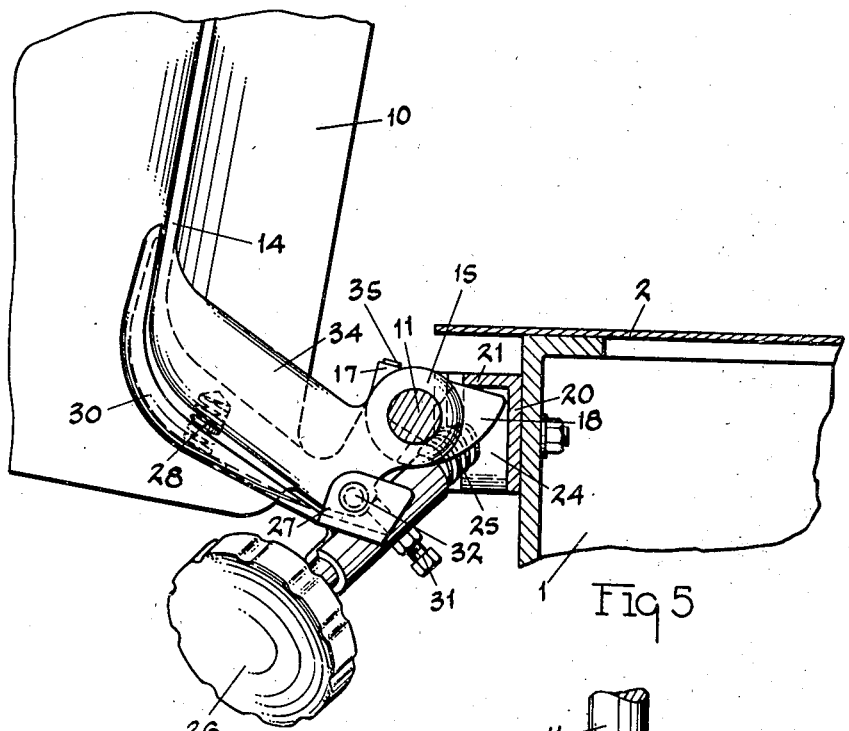
Figure 6:
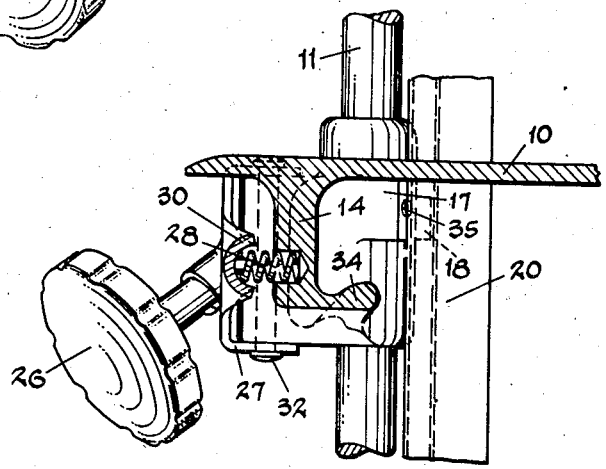

Fig. 1 illustrates a perspective view of the machine bed. Fig. 2 illustrates a front view of the machine. Fig. 3 illustrates a side view of the guide plate, the guide plate adjusting means, and parts of the machine bed. Fig. 4 is an underside view of the adjusting means and the parts shown in Fig. 3. Fig. 5 shows the guide plate swing to a position remote from the top plate or machine bed. Fig. 6 is a view of a section of the guide plate, taken on the plane of the line 6—6, indicated in Fig. 3.

The machine may be provided with the usual frame 1, to which is secured a top plate 2 and a slidable plate 4 mounted on rollers that roll in and are guided by channels 5 supported, one on the machine frame and the other on brackets 7 secured to the frame. The top surface of the plate 4 is, preferably, in the plane of the top surface of the top plate 2 of the machine and the slide plate 4 is movable, transverse the vertical meat cutting saw blade 8. The saw is in the form of a belt that extends over suitable upper and lower wheels pivotally mounted in the frame and driven by a motor, preferably, located within the machine. As is common, the meat body is placed on the movable plate 4 in position to be engaged and cut by the saw as the plate is shifted.

To accurately form the cut and its thickness, a vertical guide plate 10 is located a desired distance from the meat cutting saw and the meat slid along the guide plate. If it is desired to cut the meat bulk into parts, the guide plate may be moved away from the side of the saw and the meat cut as may be judged.

The guide plate 10 is supported on the machine for pivotal and freely slidable, lateral movements from the saw. The machine has a rack bar 11 having gear teeth 12. The rack bar is, preferably, cylindrical in form and the guide plate has an arm 14 having a head or end part 15 bored to receive the rack bar 11. The head part 15 of the arm 14 has a pair of lugs 17 and 18 and the machine has a channel guide bar 20 secured to the frame in position to locate the flanges 21 and 22, of the channeled guide bar, contiguous to the lugs 17 and 18. The upper of the flanges 21, preferably, extends the full length of the guide bar 20 and the lower of the flanges 22 terminates intermediate the end parts of the rack bar 11, preferably, at the point of termination of the teeth 12 cut in a lower side part of the rack bar 11. An end portion 24 of the flange 22 is turned up to form a stop to limit the movement of the guide plate when the guide plate is shifted along the rack bar 11. Thus, when the guide plate 10 is moved toward the saw after the guide plate has been rotated upon the rack bar 11, the lug 18 may engage the stop 24, requiring re-rotation of the guide plate toward the top plate and registration of the guide plate adjusting means, to enable the plate to pass the stop 22.

The guide plate is provided with a worm gear 25 that extends through a bearing part in the block 27 and meshes with the gear teeth of the rack bar 11. Preferably, the block 27 is provided with a handle for de-meshing the worm gear and the rack bar. To normally maintain the parts in meshed relation, a spring 28 is located intermediate the handle 30 that may be formed integral with the block. Movement of the block 27 and the handle 30 by the spring is limited by a suitable stop 31 that extends through the block 27 and engages the part of the arm that surrounds the rack bar 11. The handle 30 and the block 27 are pivotally connected to the arm 14 by the pivot pin 32 and the handle 30 extends upwardly over a flanged part 34 of the arm 14 to provide, with the handle 30, coacting handle parts for moving the worm gear 25 from the gear 12 of the rack bar 11 and, also, for slidably moving the guide plate 10 along the machine and, if desired, to a point remote from the saw 8.

The axis of the worm gear 25 is located in a position that forms an acute angle with the axis of the rack bar 11 and broadly is located at an angle materially less than 90° to the rack bar, in order to produce but a slight movement, linearly, along the rack bar upon a single rotation of the worm gear. Thus, the worm gear affords a means for substantially locking the guide plate to the rack bar to prevent longitudinal movements along the rack bar by even a very high pressure on the guide plate. It forms a means for preventing accidental displacement of the guide plate, which results in not only the formation of a thicker cut of the meat, but, also, prevents accidental injury to the hands of the operator when the guide plate has been unintentionally moved a greater than the normal distance to which it has been set by the operator as by pressing the meat by hand toward the saw and in the vicinity of the line of the cut and unexpectedly receiving a cut by placing the hand in the line of the saw that may occur by reason of the displacement of the guide plate, which is commonly used to judge the line of cut.

When the guide plate has been shifted to the end of the rack bar remote from the saw, it may be turned when pressure is applied by the hand to the handle parts 30 and 34 to rotate the arm about the rack. This may be done by reason of the fact that the lug 18 will be located exterior to the upturned end part 24 of the lower flange 22. Upon a return sliding movement, unless the guide plate is rerotated, the lug 18 will engage the stop 24 and prevent further movement of the guide plate toward the saw.

The lugs 17 and 18, thus, form means for preventing the angular rotation of the guide plate and coact to support the guide plate a short distance above the bed of the top plate 2 of the machine. Preferably, the lug 17 is provided with a hard metal stop 35 that forms a hardened surface that will prevent wearing of the upper lug 17 as it slides over the edge of the upper flange of the guide bar.

Also, if desired, the forward edge of the top plate 2 of the machine may be provided with a scaled part 37 to indicate the extent of the adjustment made in the guide plate by rotation of the handle 26, which is connected to the worm gear 25.

I claim:

1. In a meat cutting machine, a guide plate; a rack bar; an arm for pivotally supporting the plate on the rack bar and locating the plane of the face of the guide plate at right angles to the rack bar; a worm gear meshing with the teeth of the rack bar and supported on the arm, the axis of the worm inclined to the plane of the face of the guide plate and to the rack bar; and a spring pressed handle member connected to the worm gear for meshing and demeshing the gear with the rack and moving the guide plate relative to the machine cutting element.

2. In a meat cutting machine, a meat cutting element; a slidable top plate part; a guide plate along which the meat is moved by the slidable top plate; a rack bar located parallel to the plane of the slide plate and at right angles to the plane of the guide plate; an arm slidably movable along the bar for supporting the guide plate; a spring pressed block pivotally supported on the arm; a worm gear rotatably supported in the block and meshing with the rack of the bar and extending in a direction inclined to each of the guide plate and the slidable top plate part at angles substantially complements of each other; a handle member connected to the block; the handle and the arm having coacting hand gripping parts for demeshing the gear from the rack and for shifting the guide plate relative to the machine cutting element.

3. In a meat cutting machine; a guide plate; a rack bar extending at right angles to the guide plate having gear teeth formed in one end part thereof; an arm connected to the plate and pivotally supported on the rack bar; a lug located on the arm; a guide bar engaged by the lug for limiting the pivotal movements of the guide plate in one direction; a worm gear supported at an angle inclined to the rack bar less than ninety degrees and to the guide plate at the complement of the said angle; a handle for rotatably supporting the worm gear and pivotally supported on the arm for moving the gear into meshing and demeshing relation with the rack; a spring for engaging the handle and the arm for normally maintaining the gear in meshing relation with the rack; a stop part located on the guide bar at a point intermediate the end parts of the rack bar for engaging the lug to limit the sliding movement of the plate along an end part of the rack and guide bar until the plate is rotated and re-rotated and the handle is operated to produce meshing and demeshing of the rack and worm gear.

VINCENT G. BIRO.